No. 862,646. PATENTED AUG. 6, 1907.
J. LITTLE.
AIR AND WATER COOLING APPARATUS.
APPLICATION FILED OCT. 4, 1906.
Fig-1-
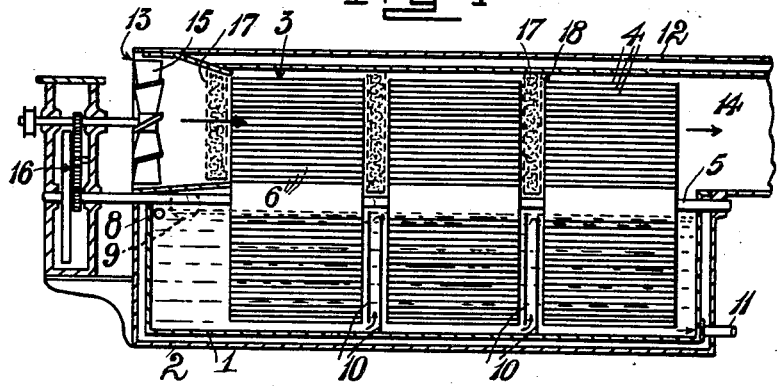
Fig-2-
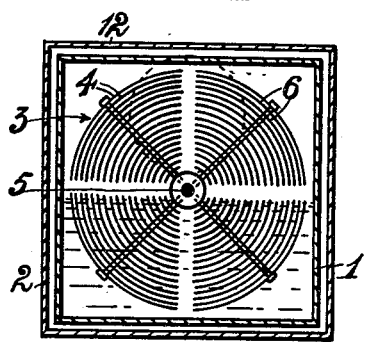
Witnesses
William G. Holden
Percy Johnston
Inventor
John Little
by
Daw Waters & Sons
Attorneys

UNITED STATES PATENT OFFICE.

JOHN LITTLE, OF CAMBERWELL, NEAR MELBOURNE, VICTORIA, AUSTRALIA.

AIR AND WATER COOLING APPARATUS.

No. 862,646.

Specification of Letters Patent.

Patented Aug. 6, 1907.

Application filed October 4, 1906. Serial No. 337,455.

*To all whom it may concern:*

Be it known that I, JOHN LITTLE, a subject of the King of Great Britain, residing at Kelvingrove, Nelson Road, Camberwell, near Melbourne, in the State of Victoria, Australia, engineer, have invented Improved Air and Water Cooling Apparatus, of which the following is a specification.

This invention relates to means for cooling air, or water, or both, and it consists in an apparatus having longitudinally arranged narrow passages formed by concentrically arranged shells, the surfaces of which are maintained in a wet condition when in operation. The air which is more or less dry traverses these passages and absorbs by evaporation a portion of the water which latter is thus cooled to a temperature equal to that of a wet bulb thermometer under similar conditions. The heat abstracted is used up by this evaporation process without sensibly increasing the temperature of the air which is then cooled down to the same temperature as that of the water by contacting with the wet surfaces of the passages. The air is also preferably dried both before entering the apparatus and during its progress therethrough by means of any suitable drying substances and said air is thus alternately dried and cooled while passing through the apparatus.

The drawings illustrating the invention comprise:—Figure 1 a longitudinal vertical section through the apparatus, and Fig. 2 a transverse section thereof.

Referring now to these figures the apparatus comprises a tank 1 situated within a comparatively long chamber 2 in which is mounted a rotatable drum 3 formed of a number of concentric shells 4 each of gradually decreasing diameter as they approach the axis or shaft 5 of the drum. Said shells are separated from each other so that the spaces between constitute a series of longitudinal annular passages 6, and the whole of the shells are preferably divided transversely into sections as shown in Fig. 1, and each section is also divided radially into any number of segments as shown in Fig. 2.
The tank 1 is kept approximately filled with water, about up to the level of the shaft of the drum the water being introduced through an inlet 8 controlled by a ball valve 9 and said tank is divided into a number of compartments corresponding to the sections of the shells by means of double baffle plates 10, 10, so arranged that the outlet water is taken from the bottom of one compartment and rises to the top of the next and is drawn finally through an outlet 11.

The chamber 2 is provided with a cover 12, the ends 13, 14, of which are open above the tank and situated within one open end 13 is a rotatable fan 15 which is employed for directing the air through the passages 6 of the drum. Said fan and drum are driven by any suitable means such as are shown at 16 in Fig. 1.

As the drum revolves through the water in the tank the several surfaces of the concentric shells of the drum forming the narrow passages are maintained wet so that a maximum of evaporation and consequent reduction of temperature is attained and when the water or air arrives at the other end of the chamber its temperature is considerably lowered.

When the apparatus is used for cooling air, drying substances 17 may be introduced into the spaces 18 between the sections of passages and in advance of the first section for the purpose of absorbing the moisture and if necessary disinfectants also may be provided.

With this invention when air and water are both being cooled or air only, both the air and water travel in the same direction or in parallel currents, but when used for cooling water only said currents travel in opposite directions.

What I claim is:—

1. In an air and water cooling apparatus a rotatable drum mounted longitudinally in the upper part of a chamber said drum being formed of a number of separated concentric shells divided radially into segments and adapted to rotate partly in a tank of water in the lower part of said chamber and means for delivering air through the longitudinal passages between the concentric shells of said drum substantially as set forth.

2. In an air and water cooling apparatus a chamber formed with inlet and outlet openings at either end, a rotatable drum mounted longitudinally in the upper part of said chamber, said drum being formed of a number of separated concentric shells arranged in sections and divided radially into segments, a water tank divided into compartments by baffle plates situated beneath said drum and filled to the height of the axis thereof, a fan for delivering air through the longitudinal passages of the drum and drying substances adapted to be placed between the sections of said drum substantially as set forth.

In testimony whereof I have hereunto set my hand in presence of two subscribing witnesses.

JOHN LITTLE.

Witnesses:
EDWARD WATERS,
EDWARD N. WATERS.